United States Patent [19]

Levy et al.

[11] 3,951,517

[45] Apr. 20, 1976

[54] WIDE ANGLED REFLECTOR UNIT FOR SPOKED WHEEL

[76] Inventors: Leon M. Levy, 2047 N. Dayton St., Chicago, Ill. 60614; David Lockett, 605 Timberlane, Lake Forest, Ill. 60045

[22] Filed: Dec. 9, 1974

[21] Appl. No.: 530,854

[52] U.S. Cl. .................................. 350/99; 116/46
[51] Int. Cl.² .......................................... G02B 5/12
[58] Field of Search .............. 116/46, 28 R; 350/97, 350/99, 102, 103, 109; 301/37 SA

[56] References Cited
UNITED STATES PATENTS

| | | | |
|---|---|---|---|
| 1,892,860 | 1/1933 | Wehr | 350/97 |
| 3,310,357 | 3/1967 | Hogan | 350/99 |
| 3,768,434 | 10/1973 | Pinter | 116/28 R |
| 3,781,082 | 12/1973 | Linder | 350/97 |

*Primary Examiner*—S. Clement Swisher
*Assistant Examiner*—Denis E. Corr
*Attorney, Agent, or Firm*—Max R. Kraus

[57] ABSTRACT

A wide angled reflector unit for securement to the spokes of a bicycle wheel, the reflector unit comprising a pair of reflector elements, each of the reflector elements having a central planar section and an angled planar side section or wing extending outwardly at an angle from each side of the central section, all integrally formed, with each of the reflector elements having reflecting surfaces on the inside facing surface thereof on the central section and on the angled side sections or wings, with one of the reflector elements nesting within the other reflector element with the reflecting surfaces of each facing the other, the pair of reflector elements being secured together and forming a single unit, means for securing the reflector unit to the spokes of a bicycle wheel, and each of the reflector elements providing a reflecting surface on each side of the reflector unit of an arc of approximately 110° which reflect laterally and forwardly and rearwardly of the wheel.

10 Claims, 6 Drawing Figures

U.S. Patent   April 20, 1976   3,951,517
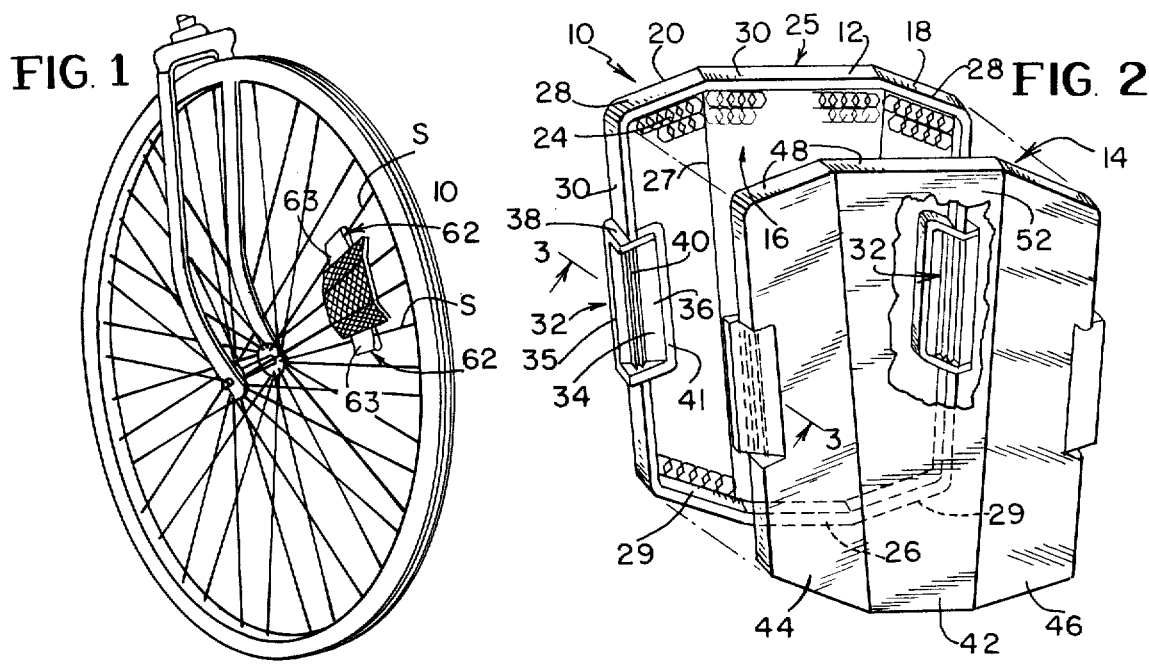
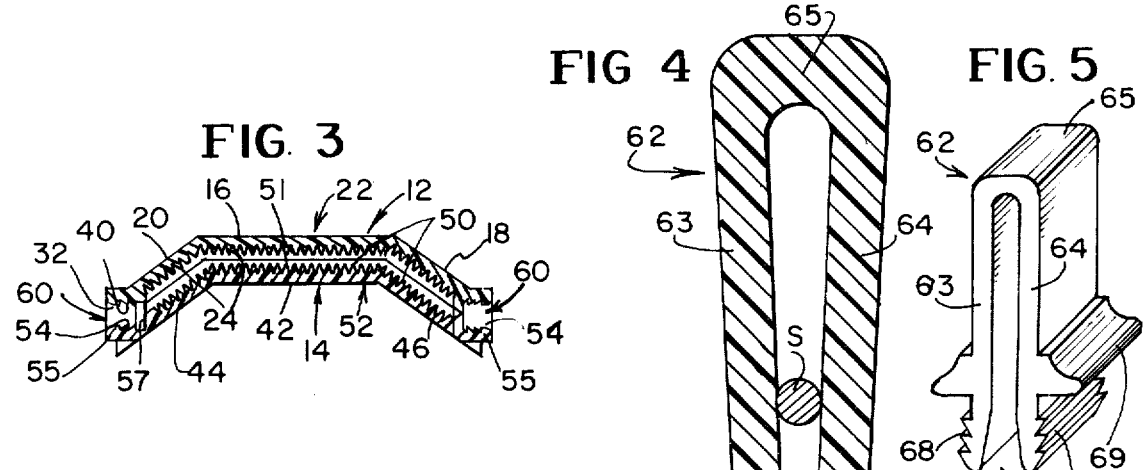
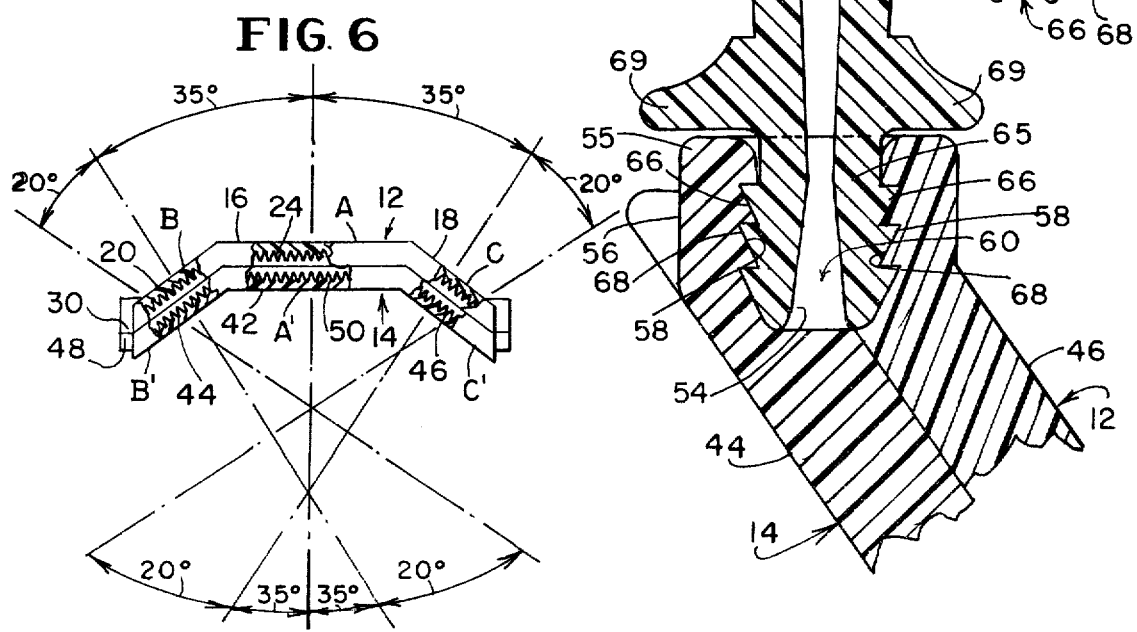

WIDE ANGLED REFLECTOR UNIT FOR SPOKED WHEEL

BRIEF DESCRIPTION OF THE INVENTION

This invention relates to a wide angled reflector unit adapted to be mounted on a bicycle wheel which engages adjacent spokes of the wheel. Various reflectors have been mounted on bicycle wheels but such reflectors are objectionable in that they generally provide a single planar surface so that the reflection is substantially perpendicular to said planar surface. An object of this invention is to provide a reflector unit in which there is provided a multiplicity of planar reflecting surfaces so that the reflections are over a wide angled area and reflect laterally and angularly forward and angularly rearward on the opposite sides of the bicycle wheel to provide for a greater safety factor than what is provided by the single planar surface reflectors.

Another object of this invention is to provide a reflector unit of the foregoing character formed of two reflecting elements, one nesting within the other, each of which is shaped to provide three planar surfaces comprising a central planar surface with oppositely extending angular planar surfaces or wings extending from said central planar surface, the cross-section of said three surfaces being sufficiently shallow so that when mounted between the spokes of a bicycle wheel the entire reflecting unit will extend substantially within the plane of the spokes and within the plane of the rim and not outwardly thereof so as not to interfere with the rotation of the wheel.

Another object of this invention is to provide a reflector unit which will meet proposed Federal specifications in respect to side reflecting surfaces.

Another object of this invention is to provide a reflector unit comprising a pair of reflector elements, each with at least three planar surfaces angled in respect to each other and each with standard reflecting prisms on the inside facing surface which are standard 20° reflex, with one reflector element nesting within the other and with the reflecting prisms facing each other in a spaced relation, and with the other facing surfaces of each of said reflector elements facing outwardly so that there is provided on both opposite sides of the unit six reflecting surfaces which reflect the light beams laterally and forwardly and rearwardly of the bicycle wheel.

Another object of this invention is to provide a reflector unit with detachable clip means whereby the reflector unit may be readily and quickly secured to the spokes of a bicycle wheel.

Another object of this invention is to provide a reflector unit comprised of a plurality of multi-faceted reflector elements which may be economically molded and inexpensively produced.

BRIEF DESCRIPTION OF THE DRAWINGS

In the drawings:

FIG. 1 is a view of the reflector unit of this invention mounted on a bicycle wheel.

FIG. 2 is an exploded view partly broken away, showing the two reflector plates prior to assembling them, nesting one within the other.

FIG. 3 is a cross-sectional view taken on line 3—3 of FIG. 2, but showing the plates in assembled nested position to form the reflector unit.

FIG. 4 is an enlarged view partly in section, showing the clip attached to the reflector unit in the manner it is attached to a bicycle wheel.

FIG. 5 is a perspective view of the clip; and

FIG. 6 is a view similar to FIG. 3 but showing the angles of reflection produced on the opposite sides of the reflector unit.

The reflector unit, generally indicated at 10, comprises a pair of reflector elements or reflex reflectors, each designated at 12 and 14 respectively, both of which are of generally similar shape. Reflector element 12 will sometimes hereinafter be referred to as the outer reflector member as it receives therewithin in nesting position reflector element 14 which will sometimes hereinafter be referred to as the inner reflector element.

The outer reflector element 12 is shaped to provide three planar surfaces or planar sections. The central planar surface or section is designated at 16, with the two opposite side planar surfaces or side wing sections 18 and 20 extending rearwardly thereof, each at an angle of approximately 35° in respect to the plane of the central or intermediate planar section 16. The exterior or outward facing surface 22 of reflector element 12 is substantially smooth while the reverse surface which forms the inwardly facing surface of the reflector element 12 is formed of a series of prismatic reflecting surfaces 24 having a standard flat 20° reflex, well-known in the art. The central or intermediate section 16 of the outer reflector element 12 is of a trapezoidal shape and, as viewed in the position shown in FIG. 2, is widest adjacent the top end 25 and narrowest at the opposite or bottom end 26 to provide the central section with inclined sides 27 where they merge with the wing sections. The width of each of the opposite side sections or wings 18 and 20 is substantially the same throughout the height or length of the reflector element 12. The top end of each of the wing sections 18 and 20 are inclined downwardly as at 28 at an angle below the horizontal top plane of the central section 16. The bottom end of said wings are inclined upwardly as at 29, above the horizontal plane of the bottom of the central section.

Extending along the top, bottom and side edges of the reflector element 12 and extending rearwardly thereof is a continuous lip or flange which forms a border generally indicated at 30. This continuous border 30 is positioned in abutting relation with the border on the inner reflector element 14 to space the inwardly facing reflecting surfaces from each other, as best seen in FIG. 3 and as will be hereinafter described. The continuous border 30 on reflector element 12 is interrupted by a recessed portion 32 on each of the wing sections 18–20, positioned intermediate the top and bottom edges and adjacent the exterior edges of the side wings. The recessed portion 32 is of rectangular shape and has a wall surface 34 which is substantially parallel to the plane of the central section 16 but which extends outwardly beyond the side border edge of the wing as at 35 and also extends inwardly as at 36 into the side wing. The recessed portion 32 has a border 38. The wall surface 34 has vertical ribs 40 and has an inner vertical shoulder 41. The recessed portion 32 extends on the inside facing surface of the reflector element 12, that is, the inside surface on which the reflecting prism surfaces are contained.

The inner reflector member 14 is shaped complementary to the shape of the outer reflector member 12 and contains substantially the same structural elements and therefore will be briefly described and the differences noted. The inner reflector member 14 has three planar surfaces, namely, a central or intermediate section 42 and wing sections 44 and 46, identical to reflector member 12, and is provided with a continuous border 48 similar to border 30. The series of prismatic reflecting surfaces 50 are like the reflecting surfaces 24 and are on the inside facing surface 51 of reflector 14, while the exterior facing surface 52 is smooth like exterior surface 22 of reflector element 12. The recessed portions 54 on the plate 14 are like the recessed portions 32 and are provided with a wall 55, a border 56, an inner vertical shoulder 57 and vertical ribs 58, similar to that previously described.

The two reflector members 12 and 14 are positioned so that the inner reflector element 14 nests within the outer reflector element 12, with the inner reflecting prisms of each, 50 and 24, facing each other but slightly spaced from contacting each other by virtue of the borders 30 and 48 of the reflector members which abut each other. The two reflector members are sonically and hermetically sealed together in the conventional manner. The outer facing surface of each reflector member will face in opposite directions, in contrast to the prisms which face each other. The recessed portions 32 and 54 of each reflector element are alined to form a generally rectangular shaped socket, generally indicated at 60, on each side of the unit to receive the clips, to be presently described, for securing the reflector unit to the spokes of the wheel. The reflector elements are each injection molded of an acrylic material which is transparent and pigmented.

FIG. 5 is a perspective view of the clip generally indicated at 62 and same is integrally molded to form a generally U-shape in end elevation and comprises a pair of spaced sides 63 and 64 connected at one end as at 65 with the front portion 66 of said sides having trensverse ribs or serrations 68 and with a transverse flange or projection 69 extending across the width of each side adjacent said serrations. FIG. 4 is an enlarged view showing the clip 62 extending between the spokes of a wheel and attached to socket 60 of the reflector unit 10. FIG. 1 shows the two clips 62, one on each side of the reflector unit, securing the reflector unit to two spokes of a wheel.

The reflector unit 10 is secured between two adjacent spokes S of the wheel and is positioned as shown in FIG. 1 and then the clips 62 are inserted over the spokes S and then inserted into the sockets 60 in the reflector unit. As the clips are positioned to extend around the spokes S they tend to spread the sides 63 and 64 of the clip from each other so that when the front portions 66 of the clips are inserted into their respective sockets 60 in the reflector unit they will tend to urge or tension the sides of the clip outwardly to more firmly lock the clip to the reflector unit. The transverse ribs 68 of the clip will lock with the vertical ribs 40 and 58 of the recessed portions forming the socket 60.

As viewed in FIG. 1, the reflector unit is positioned between the spokes of the wheel and is so shallow that when so secured the entire reflector unit is confined within the conical plane of the spokes of the wheel. Six planar reflecting surfaces are formed by this unit and same are best seen in FIG. 3 with the wide reflecting angles formed thereby, said reflecting surfaces from reflector element 12 being reflecting surface A from the central planar section 16, and angular reflecting surfaces B and C from the planar wing sections 20 and 18 respectively. Reflector element 14 reflects in the opposite direction and reflecting surface A' reflects from the central planar section 42, and angular reflecting surfaces B' and C' from the planar wing sections 44 and 46 respectively.

Each of the six planar surfaces of the reflector unit has a photometric axis which is perpendicular to its respective planar surface. Each of the six planar surfaces are photometrically effective 20° on either side of the photometric axis. Thus, as indicated by the angles and lines in FIG. 6, the three planar surfaces on each side of the reflector unit reflect through a continuous arc of 110° and presents a wide angled reflecting surface on each of the opposite sides of the wheel and presents a reflecting surface which reflects laterally as well as angularly forward and angularly rearward of the wheel, thus providing a great safety factor.

The reflector unit may be readily attached to a spoked wheel without the use of any tools or extraneous fastening means.

What is claimed is:

1. A wide angled reflector unit for securement to the spokes of a bicycle wheel, said reflector unit comprising a pair of reflector elements, each of said reflector elements having a central section and an angled side section or wing extending outwardly at an angle from each side of said central section, all integrally formed, each said reflector element having outward facing surfaces and inward facing surfaces with said inward facing surfaces each formed with a series of prismatic reflecting surfaces on said central sections and on said angled side sections, one of said pair of reflector elements positioned adjacent the other reflector element with said inward reflecting surfaces of each parallel and facing the other corresponding inward reflective surface and with the outward facing surfaces of each reflector element facing outwardly in opposite directions, said pair of reflector elements being secured together and forming a single unit, and means for securing said reflector unit to the spokes of a bicycle wheel, said reflector unit providing reflecting surfaces on each side of the reflector unit which reflect laterally and forwardly and rearwardly of the wheel on each side of the wheel.

2. A wide angled reflector unit as set forth in claim 1 in which the central sections and the angled sections or wings are all planar.

3. A wide angled reflector unit as set forth in claim 2 in which the angled sections or wings are each at an angle of approximately 35° in respect to the plane of the central section and in which the reflecting surfaces of each section are formed of standard flat 20° reflex.

4. A wide angled reflector unit as set forth in claim 2 in which the central section is of a trapezoidal shape and in which the angled side sections or wings each have a uniform width along their length.

5. A wide angled reflector unit as set forth in claim 2 in which the reflector unit is shallow and when attached to the spokes extends substantially in the plane of the spokes and within the opposite planes of the rim of the wheel.

6. A wide angled reflector unit as set forth in claim 1 in which the angled sections or wings are each at an angle of approximately 35° in respect to the plane of the central section.

7. A wide angled reflector unit as set forth in claim 1 in which each reflector element has border edges which space the inwardly facing reflecting surfaces slightly from each other.

8. A wide angled reflector unit as set forth in claim 1 in which a socket is formed adjacent the side edges of said angled side sections or wings with said sockets having a gripping surface and in which the means for securing the reflector unit to the spokes of the wheel comprise clip members, the inner ends of which are secured within said sockets to hold said reflector unit to the spokes of the wheel.

9. A wide angled reflector unit as set forth in claim 8 in which the clip is generally U-shaped and has opposite sides connected at one end and open at the other end, with the opposite sides engaging the spoke of the wheel and with the open end secured within the socket, said opposite sides of the clip when in engagement with the spokes tending to place the sides of the clip under tension to lock said sides in said socket.

10. A wide angled reflector unit as set forth in claim 1 in which the central sections and the angled side sections or wings provide reflecting surfaces on each side of the reflector unit of an arc of approximately 110°.

* * * * *